United States Patent
Booth et al.

(10) Patent No.: US 12,430,506 B2
(45) Date of Patent: Sep. 30, 2025

(54) CONVERSATIONAL SYSTEM ACTION PRESENTATION

(71) Applicant: International Business Machines Corporation, Armonk, NY (US)

(72) Inventors: Amanda Booth, Durham, NC (US); Kylee Mikel Barnard, Austin, TX (US); Lauren Allison Goldstein, Austin, TX (US); Lionel Wu, North York (CA); Salman Saleem Sheikh, Sanford, FL (US); Shay Hall, Durham, NC (US); Shubham Agarwal, Cambridge, MA (US); Varun Sangwan, Markham (CA); Yara Rizk, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 315 days.

(21) Appl. No.: 17/483,113

(22) Filed: Sep. 23, 2021

(65) Prior Publication Data
US 2023/0088280 A1 Mar. 23, 2023

(51) Int. Cl.
H04L 51/02 (2022.01)
G06F 40/279 (2020.01)

(52) U.S. Cl.
CPC ............ *G06F 40/279* (2020.01); *H04L 51/02* (2013.01)

(58) Field of Classification Search
CPC ......... G06F 40/279; G06F 40/35; H04L 51/02
See application file for complete search history.

(56) References Cited

U.S. PATENT DOCUMENTS 7,448,019 B2 * 11/2008 Kovacs ................. G06F 11/323
  717/100
7,898,963 B2 * 3/2011 Ottamalika ............. H04L 41/22
  726/13

(Continued)

FOREIGN PATENT DOCUMENTS

CN 111651348 A 9/2020
EP 3746916 A1 12/2020

OTHER PUBLICATIONS

Rizk, Yara, et al. "A unified conversational assistant framework for business process automation." arXiv preprint arXiv:2001.03543 (2020). (Year: 2020).*

(Continued)

*Primary Examiner* — Bhavesh M Mehta
*Assistant Examiner* — Nandini Subramani
(74) *Attorney, Agent, or Firm* — Garg Law Firm, PLLC; Rakesh Garg; Kristofer Haggerty

(57) ABSTRACT

A natural language input is communicated to a back end application. Candidate agent data communicated from the back end application is presented. The candidate agent data comprises data of a set of agents considered by the back end application for performance of a command extracted from the natural language input. Candidate agent score data communicated from the back end application is presented. The candidate agent score data comprises score data of an agent in the set of agents. Selected agent data communicated from the back end application is presented. The selected agent data comprises data of a selected agent in the set of agents, the selected agent selected by the back end application for performance of the command. Skill performance data communicated from the back end application is presented. The skill performance data comprises data of a processing step performed by the selected agent.

18 Claims, 14 Drawing Sheets

(56) References Cited

U.S. PATENT DOCUMENTS

| | | | | |
|---|---|---|---|---|
| 8,041,588 | B2* | 10/2011 | Gilbert | G06Q 10/00 |
| | | | | 705/7.11 |
| 9,189,529 | B2* | 11/2015 | Buxbaum | G06F 16/26 |
| 9,607,102 | B2* | 3/2017 | Lavallee | G10L 15/1822 |
| 10,762,892 | B2* | 9/2020 | Rusak | G10L 15/063 |
| 10,777,194 | B2 | 9/2020 | Zohar et al. | |
| 10,896,480 | B1* | 1/2021 | Abou-Nassif | G06F 9/4881 |
| 10,949,623 | B2 | 3/2021 | Galitsky | |
| 11,030,250 | B2* | 6/2021 | DeLuca | G06F 16/951 |
| 11,334,785 | B2* | 5/2022 | Hu | G06F 16/9027 |
| 2020/0259891 | A1* | 8/2020 | Abraham | H04L 67/1008 |
| 2020/0342850 | A1* | 10/2020 | Vishnoi | G06F 40/30 |
| 2020/0342874 | A1* | 10/2020 | Teserra | G06F 40/263 |
| 2022/0036610 | A1* | 2/2022 | Wang | G06N 5/00 |
| 2022/0147719 | A1* | 5/2022 | Stoyanchev | G10L 15/1822 |

OTHER PUBLICATIONS

Rizk, Yara, et al. "A conversational digital assistant for intelligent process automation." Business Process Management: Blockchain and Robotic Process Automation Forum: BPM 2020 Blockchain and RPA Forum, Seville, Spain, Sep. 13-18, 2020, Proceedings 18. Springer International Publishing, 2020. (Year: 2020).*

Zintgraf et al., Visualizing Deep Neural Network Decisions: Prediction Difference Analysis, ICLR 2017, Feb. 15, 2017.

* cited by examiner

Fig. 8

STATUS TABLE 610

| AGENT STRING | AGENT CONF. SCORE | SELECTED? | SKILL STEP # | SKILL STEP STRING | PROGRESS |
|---|---|---|---|---|---|
| PRICE QUOTE | 98% | Y | 1 | CREATE QUOTE | 100% |
| PRICE QUOTE | 98% | Y | 2 | ANALYZE CONTENT | 100% |
| PRICE QUOTE | 98% | Y | 3 | ADD PRODUCTS | 100% |
| PRICE QUOTE | 98% | Y | 4 | UPDATE QUOTE | 45% |
| APPROVAL TRACKER | 94% | N | | | |
| SALES DATA RETRIEVAL | 32% | N | | | |
| DISCOUNT GOVERNANCE | 28% | N | | | |
| GENERAL CONVERSATION | 20% | N | | | |
| CLARIFICATION | 20% | N | | | |
| QUOTE DISCOUNT | 20% | N | | | |
| INSTANCE CREATOR | 20% | N | | | |
| DATA VISUALIZATION | 12% | N | | | |
| EXPLAINER | 6% | N | | | |
| EMAIL | 6% | N | | | |

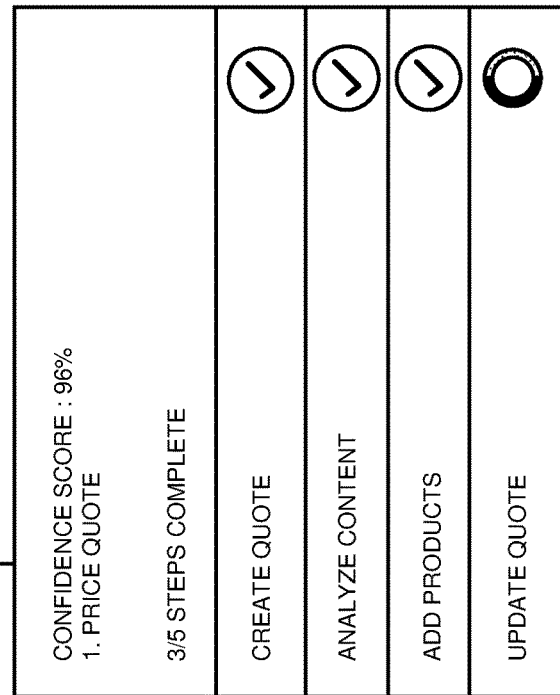

SKILL PRESENTATION 820

CONFIDENCE SCORE : 96%
1. PRICE QUOTE

3/5 STEPS COMPLETE

CREATE QUOTE

ANALYZE CONTENT

ADD PRODUCTS

UPDATE QUOTE

CONVERSATIONAL SYSTEM ACTION PRESENTATION

BACKGROUND

The present invention relates generally to a method, system, and computer program product for a conversational system. More particularly, the present invention relates to a method, system, and computer program product for conversational system action presentation.

A conversational system, or chatbot, is a computer program that uses one or more artificial intelligence and natural language processing techniques to understand user inputs, typically expressed in natural language form, and automate responses to inputs, simulating human conversation. Chatbots are used to personalize customer experiences, streamline incoming communications and direct customers to resources, and perform other human-computer interface tasks.

Within a conversational system, a user input is referred to as an utterance, and a combination of an utterance and the system's response to the utterance is referred to as a conversational turn. Conversational systems typically have an ability to use context established during previous conversational turns to help process a current utterance. For example, a user might ask the system, "Where am I supposed to be at 3?", the system might respond with an address or a conference room, and the user might follow up with, "How long will it take to get there?" Here, the system has established sufficient context to determine that "there" likely refers to the location of the user's 3 pm meeting, and responds accordingly.

A conversational system typically includes a user input processor, which processes user input in the form of text, audio (converted to text), handwriting (converted to text), gesture (interpreted by a gesture recognition system from video or other sensor measurements), or another input form. A dialogue manager analyzes the input, keeps track of context, and manages conversational flow. Based on the analyzed input, one or more agents are shortlisted, scored, selected, and sequenced. An agent has knowledge of a specific task domain. For example, in a conversational system configured for sales support, one agent might handle tasks related to price quotes, while another agent might handle tasks related to sales data retrieval and presentation, and a third agent might track an approval process. Each agent includes one or more skills, or steps the agent uses to perform a task within a task domain. For example, the approval process task might include a skill involving natural language understanding, to interpret the user's input, and a skill to generate a sequence of notifications to users in specific roles, and monitor the results, to complete an approval process.

SUMMARY

The illustrative embodiments provide a method, system, and computer program product. An embodiment includes a method that communicates, to a back end application, a natural language input. An embodiment presents candidate agent data communicated from the back end application, the candidate agent data stored in a data structure by the back end application, the candidate agent data comprising data of a set of agents considered by the back end application for performance of a command extracted from the natural language input. An embodiment presents candidate agent score data communicated from the back end application, the candidate agent score data stored in the data structure by the back end application, the candidate agent score data comprising score data of an agent in the set of agents. An embodiment presents selected agent data communicated from the back end application, the selected agent data stored in the data structure by the back end application, the selected agent data comprising data of a selected agent in the set of agents, the selected agent selected by the back end application for performance of the command. An embodiment presents skill performance data communicated from the back end application, the skill performance data stored in the data structure by the back end application, the skill performance data comprising data of a processing step performed by the selected agent.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 8 depicts a continued example of conversational system action presentation in accordance with an illustrative embodiment;

DETAILED DESCRIPTION

Figure 1:
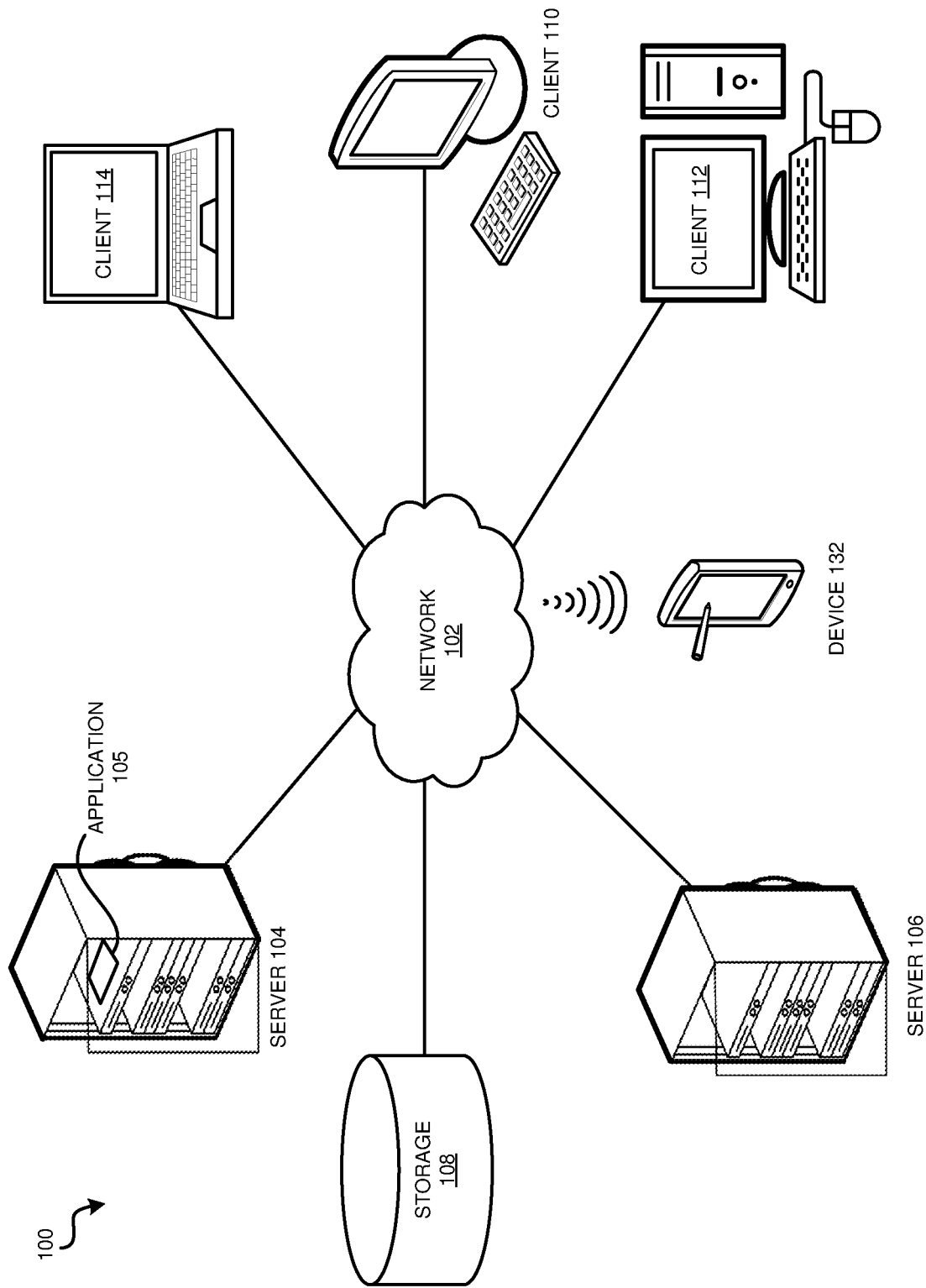
FIG. 1 depicts a block diagram of a network of data processing systems in which illustrative embodiments may be implemented.

The illustrative embodiments recognize that users often find conversational systems too opaque. For example, a conversational system might be unable to correctly interpret a user's input and simply ask the user to rephrase, without providing an explanation as to what the system did not understand or which portion of the input should be rephrased. As another example, a conversational system might select the wrong agent, producing output the user was not asking for. As a third example, a conversational system might select the wrong agent, perform an incorrect task, and fail to notify the user as to which task was performed. As a result, the user would have no way to know that incorrect activity was performed or be able to correct the problem. As well, a user is more likely to trust the output of a conversational system if the user is provided with an explanation of which agent was selected and which tasks the agent performed. In addition, a user provided with an explanation can use that explanation to detect a pattern of incorrect agent or task selection and provide appropriate feedback to a conversational system designer. Thus, the illustrative embodiments recognize that there is an unmet need to present, or explain, a conversational system's actions.

The illustrative embodiments recognize that the presently available tools or solutions do not address these needs or provide adequate solutions for these needs. The illustrative embodiments used to describe the invention generally address and solve the above-described problems and other problems related to conversational system action presentation.

An embodiment can be implemented as a software application. The application implementing an embodiment can be configured as a modification of an existing conversational system, as a separate application that operates in conjunction with an existing conversational system, a standalone application, or some combination thereof.

Particularly, some illustrative embodiments provide a method that communicates a natural language input to a back end application and presents data communicated from the back end application. The data has been stored in a data structure by the back end application.

An embodiment receives a user input, or utterance, via a presently known technique. If the utterance is received in a form other than text, one embodiment converts the utterance to text form using a presently known technique. For example, techniques are presently available to convert audio and handwriting to text form, and classify motions sensed by a gesture sensor or detected in video to one of a set of gestures expressed in text form. The utterance is typically in a natural language form, but need not be in any particular language or conform to a specific grammar of a language. Just as human users in in-person conversation with each other do not always converse in complete, grammatically correct sentences, human users in conversation with an automated conversational system also do not always converse in complete, grammatically correct sentences.

An embodiment communicates an utterance received from a user to a back end application or back end module of the same application as the embodiment. If the back end application is separate from the embodiment, the back end application executes on the same system as the embodiment or in a different system from the embodiment. The embodiment and the back end application communicate data using a presently known technique. In one non-limiting example configuration, an embodiment and back end application executing in different systems communicate via a communications network such as the Internet. If the utterance is received in a form other than text, one embodiment converts the utterance to text form and communicates the utterance in text form. Another embodiment communicates the utterance to the back end application in the form in which the utterance was received, and the back end application converts the utterance to text form.

Within the back end application, a dialogue manager analyzes the input, keeps track of context, and manages conversational flow. Based on the analyzed input, the back end application shortlists, scores, selects, and sequences one or more agents to execute commands responsive to the input. The back end application records its actions with respect to agents in a data structure, and communicates the data structure and its contents to an embodiment.

An embodiment presents candidate agent data communicated from the back end application, The candidate agent data has been stored in a data structure by the back end application. Candidate agent data is data of a set of agents considered by the back end application for performance of a command extracted from the natural language input. For example, if the natural language input was "Put together a quote for this opportunity", the extracted command was "generate sales quote", and the back end application considered eleven agents to perform the quote generation, the back end application stores data of one or more of the agents in a data structure and communicates the data structure and its contents to an embodiment. Some non-limiting examples of data of an agent are a text string describing the agent (e.g., "update quote") and a number referencing the agent (e.g., 8).

An embodiment presents candidate agent score data communicated from the back end application. The candidate agent score data has been stored in the data structure by the back end application. Candidate agent score data is score data of a candidate agent. In one embodiment, the score data is a confidence score denoting the back end application confidence that the candidate agent is capable of performing a command extracted from natural language input. For example, if the command is "generate quote", a confidence score for one agent (e.g., an "update quote" agent configured to update sales quotes) might be 98%, while a confidence score for another agent (e.g., a "clarification" agent configured to ask a user for a clarification of the user's previous input) might be 20%. Candidate agent score data need not be in any particular format or range, and need not be numerical.

An embodiment presents selected agent data communicated from the back end application. The selected agent data has been stored in the data structure by the back end application. Selected agent data is data of a selected agent the back end application selected for performance of a command extracted from natural language input. Selected agent data includes whether or not an agent was selected, as well as other data of an agent, such as a text string describing the agent (e.g., "update quote").

An embodiment presents skill performance data communicated from the back end application. The skill performance data has been stored in the data structure by the back end application. Skill performance data is data of a processing step performed by a selected agent. Some non-limiting examples of skill performance data are a text string describing the skill (e.g., "create quote"), a number referencing the skill (e.g., 1), a total number of skills the agent performs (e.g., 4, for use in presenting progress information such as skill 1 of 4), and a completion percentage of the skill (e.g., 45% or 100%).

The back end application is configurable to update the data structure and its contents when the back end application completes an agent selection step, when an agent completes a skill, at periodic time intervals whether or not a particular step or skill has been completed, or only once after all skills have been completed. The back end application is also configurable to communicate the data structure and its contents when the data structure is updated, at periodic time intervals whether or not a particular step or skill has been completed or an update has been performed, or only once after all skills have been completed. In addition, the update and communication schedules need not be the same. The back end application is also configurable to communicate with an embodiment upon a request from the embodiment, or without a request from the embodiment. Other back end application configurations, with other data structure update and communication configurations, are also possible and contemplated within the scope of the illustrative embodiments. Similarly, embodiments present data structure data, and update already-presented data, as the data is received, at periodic time intervals whether or not additional data has been received, or only after a final set of data has been received. Other embodiments, with other data structure presentation options, are also possible and contemplated within the scope of the illustrative embodiments.

An embodiment provides a user an opportunity to select one or more portions of the presented data. One embodiment responds to a user's selection of presented data by providing additional detail of the selected portion. For example, in response to a user's selection of an agent, the embodiment might provide additional detail of the agent's function or the tasks the agent is able to perform. Another embodiment responds to a user's selection of presented data by modifying future behavior of the conversational system. For example, in response to a user's selection of an agent that the back end application had not initially selected to perform a task, the embodiment communicates the user's selection of an alternate agent to the back end application. In response, the back end application executes the alternate agent, and uses the user's feedback to improve agent selection in the future.

The manner of conversational system action presentation described herein is unavailable in the presently available methods in the technological field of endeavor pertaining to conversational systems. A method of an embodiment described herein, when implemented to execute on a device or data processing system, comprises substantial advancement of the functionality of that device or data processing system in communicates a natural language input to a back end application and presents data communicated from the back end application. The data has been stored in a data structure by the back end application.

The illustrative embodiments are described with respect to certain types of data, presentations, presentation schedules, agents, skills, statuses, back end applications and their configurations, responses, rankings, scorings, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
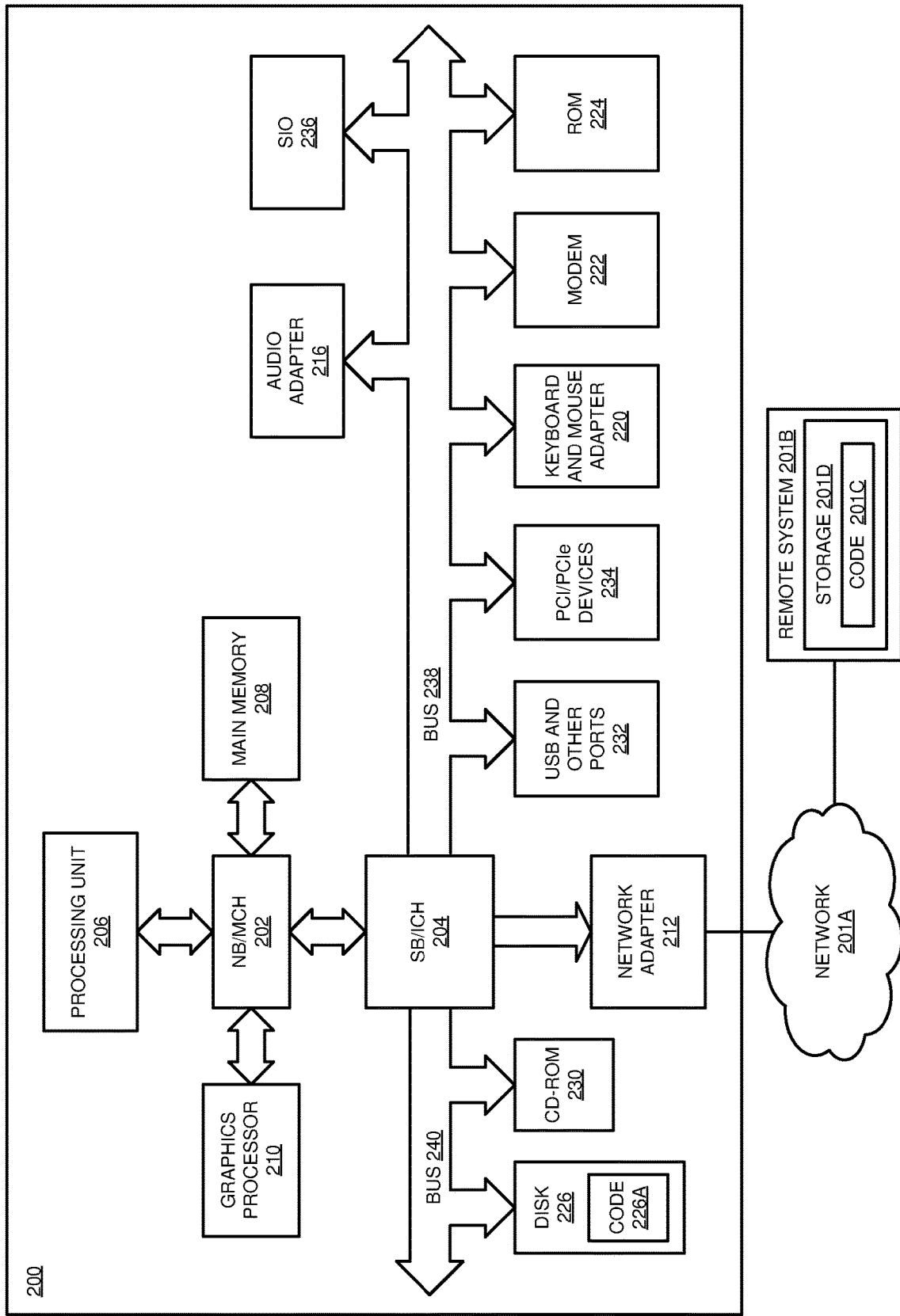
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Application 105 communicates with a back end application executing in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
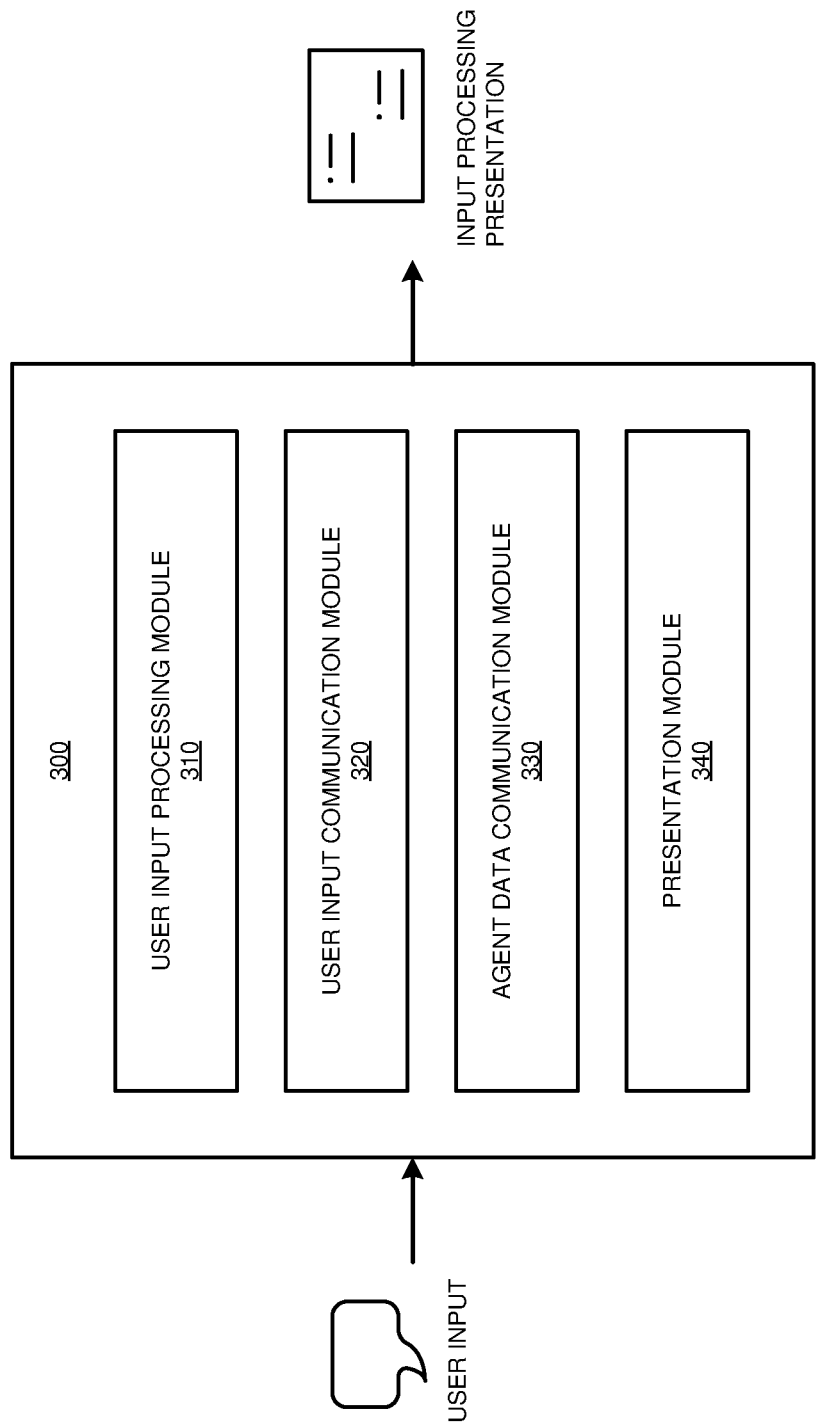
FIG. 3 depicts a block diagram of an example configuration for conversational system action presentation in accordance with an illustrative embodiment.

With reference to FIG. 3, this figure depicts a block diagram of an example configuration for conversational system action presentation in accordance with an illustrative embodiment. Application 300 is an example of application 105 in FIG. 1 and executes in any of servers 104 and 106, clients 110, 112, and 114, and device 132 in FIG. 1.

User input processing module 310 receives a user input, or utterance, via a presently known technique. If the utterance is received in a form other than text, one implementation of module 310 converts the utterance to text form using a presently known technique. For example, techniques are presently available to convert audio and handwriting to text form, and classify motions sensed by a gesture sensor or detected in video to one of a set of gestures expressed in text form. The utterance is typically in a natural language form, but need not be in any particular language or conform to a specific grammar of a language.

User input communication module 320 communicates an utterance received from a user to a back end application or back end module of application 300. If the back end application is separate from application 300, the back end application executes on the same system as application 300 or in a different system from application 300. Module 320 and the back end application communicate data using a presently known technique. In one non-limiting example configuration, module 320 and a back end application executing in different systems communicate via a communications network such as the Internet. If the utterance is received in a form other than text, module 310 converts the utterance to text form and module 320 communicates the utterance in text form. In another implementation of application 300, module 320 communicates the utterance to the back end application in the form in which the utterance was received, and the back end application converts the utterance to text form.

Agent data communication module 330 receives a data structure and its contents communicated from a back end application. Presentation module 340 presents data received from the back end application. Implementations of module 340 present data structure data, and update already-presented data, as the data is received, at periodic time intervals whether or not additional data has been received, or only after a final set of data has been received. More detail of module 340 is depicted in FIG. 4.

Figure 4:
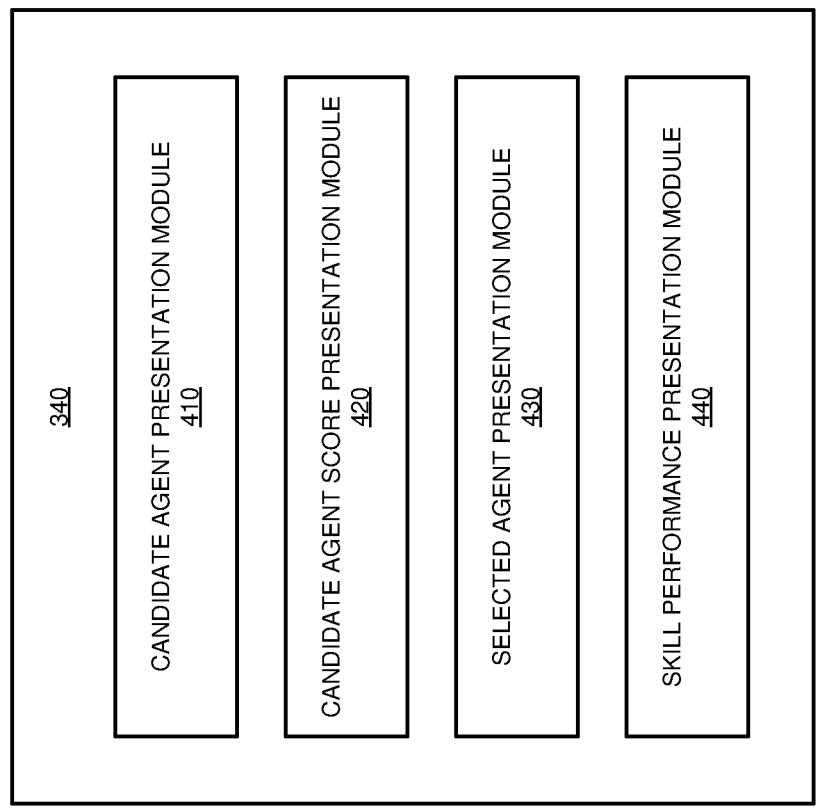
FIG. 4 depicts a block diagram of an example configuration for conversational system action presentation in accordance with an illustrative embodiment.

With reference to FIG. 4, this figure depicts a block diagram of an example configuration for conversational system action presentation in accordance with an illustrative embodiment. In particular, FIG. 4 depicts more detail of module 340 in FIG. 3.

Candidate agent presentation module 410 presents candidate agent data communicated from the back end application, The candidate agent data has been stored in a data structure by the back end application.

Candidate agent score presentation module 420 presents candidate agent score data communicated from the back end application. The candidate agent score data has been stored in the data structure by the back end application.

Selected agent presentation module 430 presents selected agent data communicated from the back end application. The selected agent data has been stored in the data structure by the back end application.

Skill performance presentation module 440 presents skill performance data communicated from the back end application. The skill performance data has been stored in the data structure by the back end application.

Figure 5:
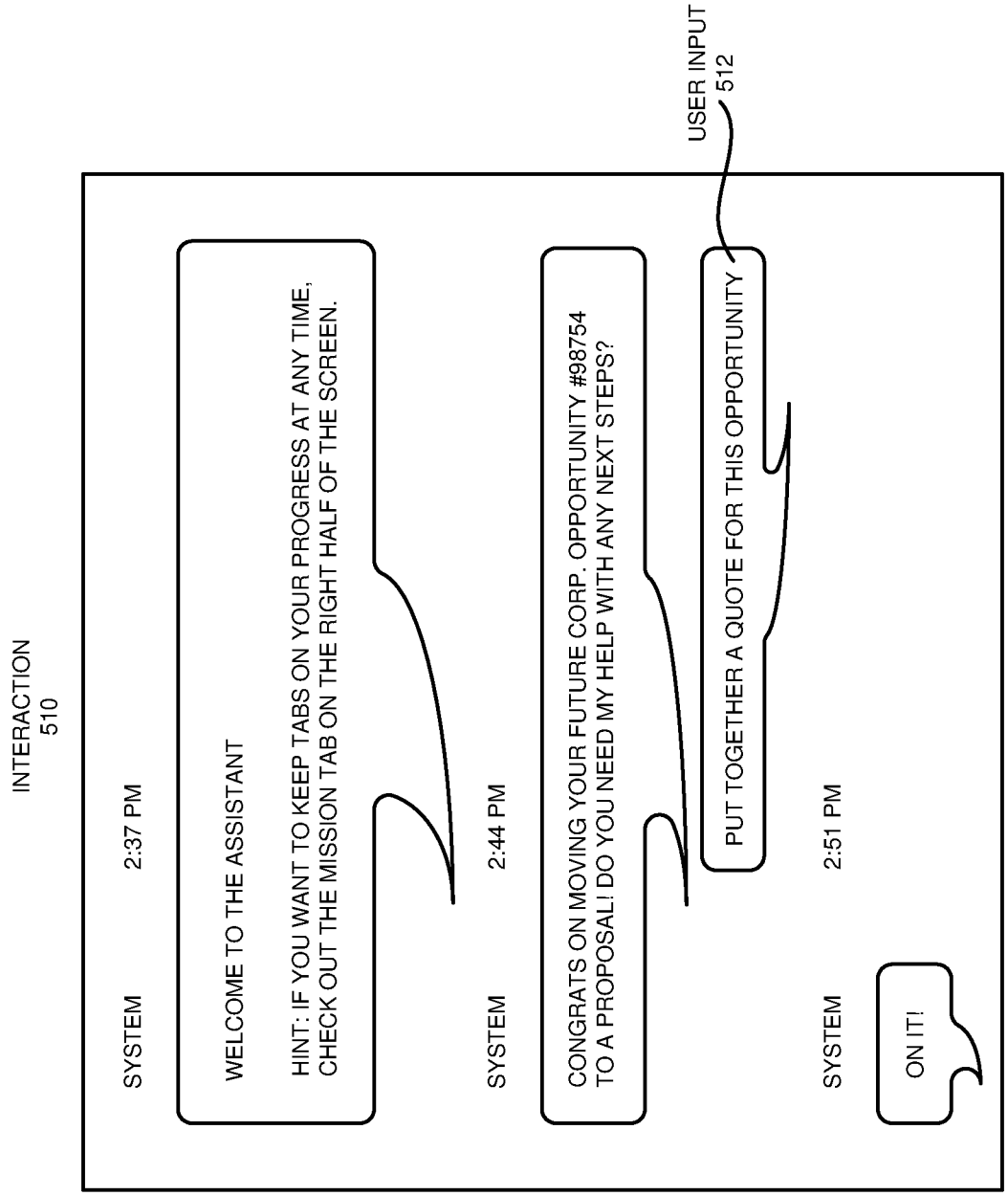
FIG. 5 depicts an example of conversational system action presentation in accordance with an illustrative embodiment.

With reference to FIG. 5, this figure depicts an example of conversational system action presentation in accordance with an illustrative embodiment. The example can be executed using application 300 in FIG. 3.

As depicted, interaction 510 includes user input 512. Application 300 receives user input 512 and communicates it to a back end application or back end module of the application 300. Within the back end application, a dialogue manager analyzes the input, keeps track of context, and manages conversational flow. Based on user input 512 and the context in interaction 510, the back end application shortlists, scores, selects, and sequences one or more agents to execute commands responsive to the input. The back end application records its actions with respect to agents in a data structure, and communicates the data structure and its contents to application 300.

Figure 6:
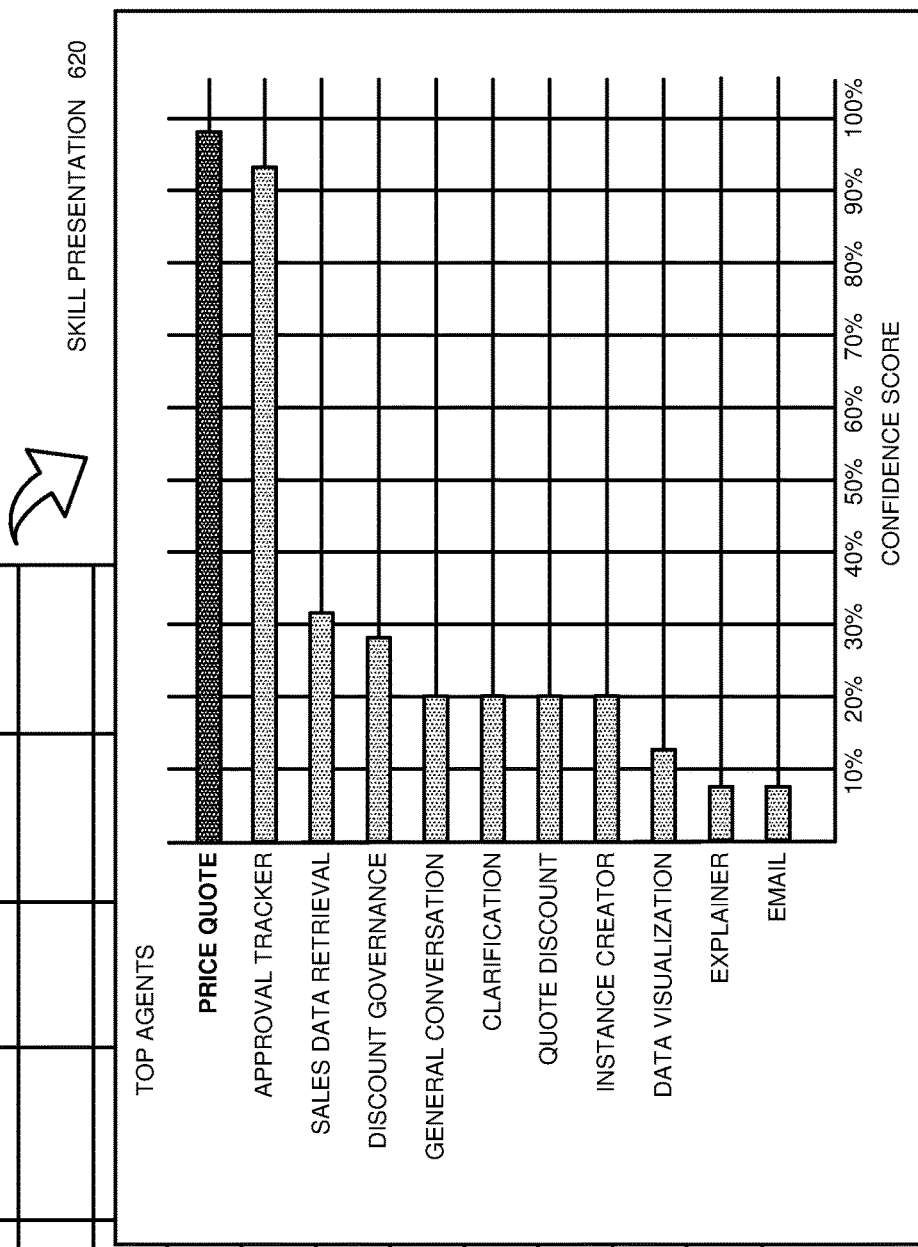
FIG. 6 depicts a continued example of conversational system action presentation in accordance with an illustrative embodiment.

With reference to FIG. 6, this figure depicts a continued example of conversational system action presentation in accordance with an illustrative embodiment.

In particular, FIG. 6 depicts conversational system action presentation in response to user input 512 in FIG. 5. Status table 610 depicts a data structure and data received from the back end application. The data includes candidate agent data of a set of agents considered by the back end application for performance of a command extracted from user input 512, for example text strings describing a set of candidate agents and confidence scores corresponding to each candidate agent. Candidate agent presentation module 410 and candidate agent score presentation module 420 process data in status table 610 and present the results in skill presentation 620.

Figure 7:
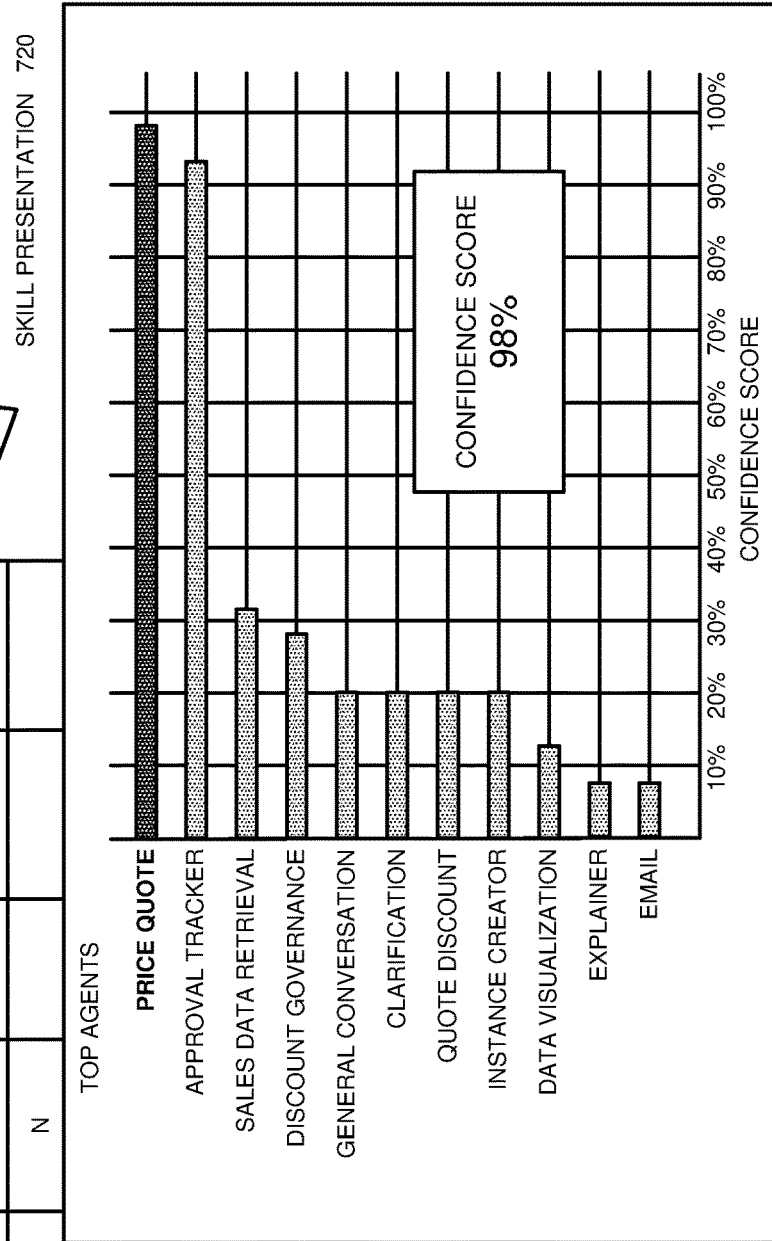
FIG. 7 depicts a continued example of conversational system action presentation in accordance with an illustrative embodiment.

With reference to FIG. 7, this figure depicts a continued example of conversational system action presentation in accordance with an illustrative embodiment. Status table 610 is the same as status table 610 in FIG. 6, with additional data added.

In particular, FIG. 7 depicts conversational system action presentation in response to user input 512 in FIG. 5. Status table 610 now includes candidate agent score data of the set of candidate agents considered by the back end application for performance of a command extracted from user input 512, for example whether or not a particular agent was selected. Candidate agent score presentation module 420 and selected agent presentation module 430 process data in status table 610 and present the results in skill presentation 720.

With reference to FIG. 8, this figure depicts a continued example of conversational system action presentation in accordance with an illustrative embodiment. Status table 610 is the same as status table 610 in FIG. 6, with additional data added.

In particular, FIG. 8 depicts conversational system action presentation in response to user input 512 in FIG. 5. Status table 610 now includes skill performance data of one or more skills performed by a selected agent, including a step number, a corresponding text description, and a completion percentage of the skill, Skill performance presentation module 440 processes data in status table 610 and presents the results in skill presentation 820.

Figure 9:
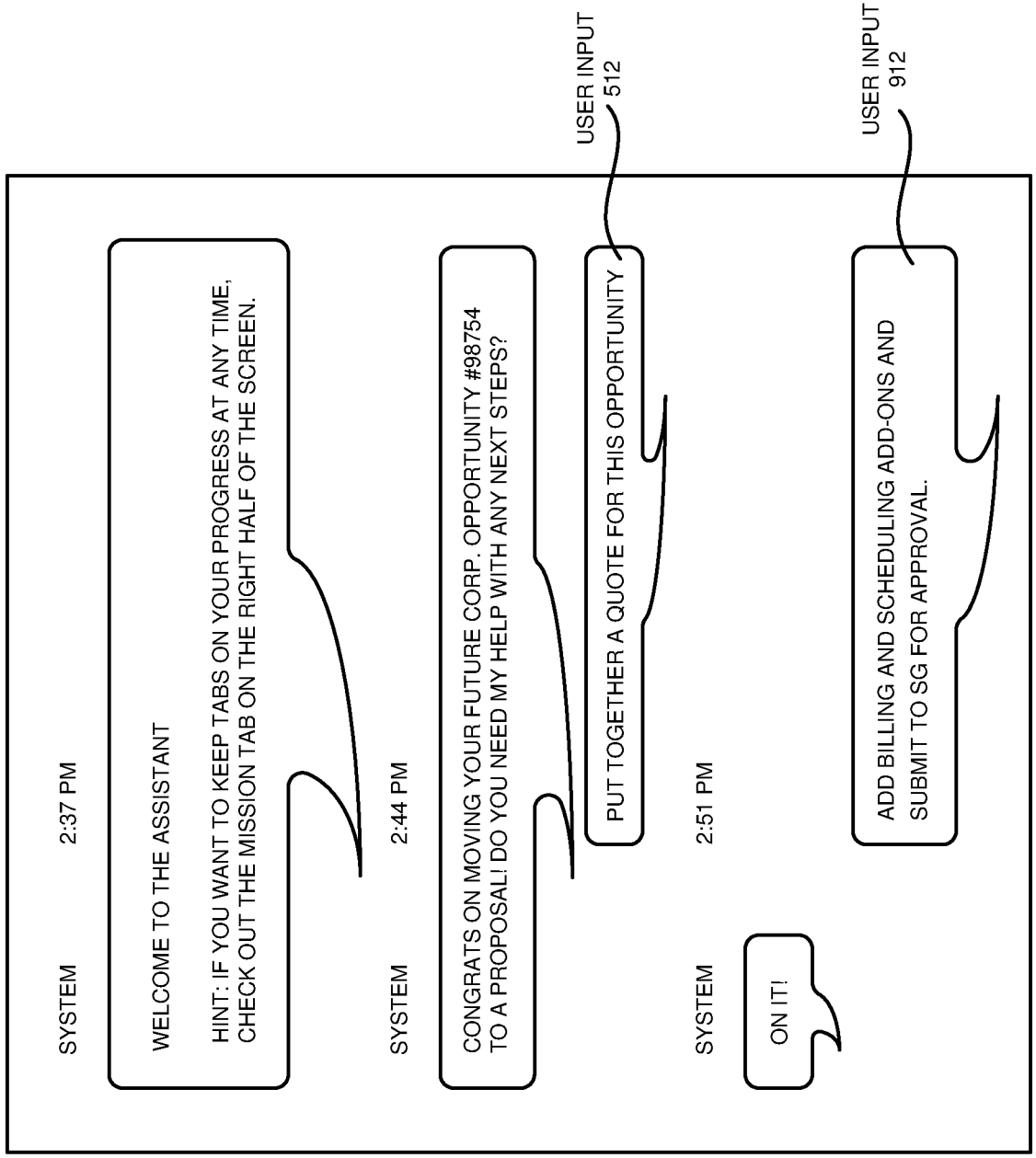
FIG. 9 depicts a continued example of conversational system action presentation in accordance with an illustrative embodiment.

With reference to FIG. 9, this figure depicts a continued example of conversational system action presentation in accordance with an illustrative embodiment. Interaction 510 and user input 512 are the same as interaction 510 and user input 512 in FIG. 5

As depicted, interaction 510 has continued, now including user input 912. Application 300 receives user input 912 and communicates it to a back end application or back end module of the application 300. Within the back end application, a dialogue manager analyzes the input, keeps track of context, and manages conversational flow. Based on user input 912 and the context in interaction 510, the back end application shortlists, scores, selects, and sequences one or more agents to execute commands responsive to the input. The back end application records its actions with respect to agents in a data structure, and communicates the data structure and its contents to application 300.

Figure 10:
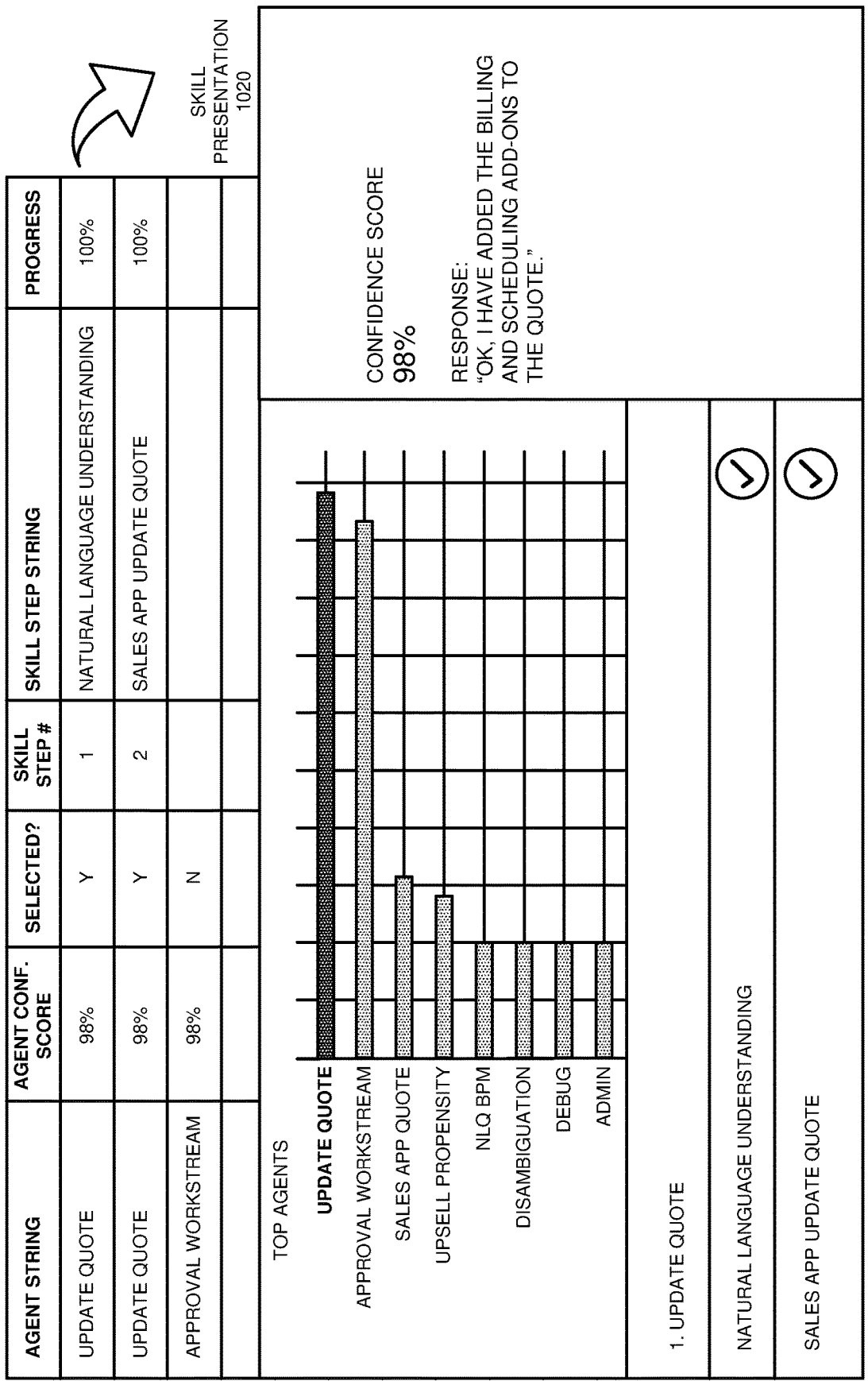
FIG. 10 depicts a continued example of conversational system action presentation in accordance with an illustrative embodiment.

With reference to FIG. 10, this figure depicts a continued example of conversational system action presentation in accordance with an illustrative embodiment. Status table 610 is the same as status table 610 in FIG. 6, with additional data added.

In particular, FIG. 10 depicts conversational system action presentation in response to user input 912 in FIG. 9. Status table 610 now includes skill performance data of one or more skills performed by a selected agent, including a step number, a corresponding text description, and a completion percentage of the skill, Skill performance presentation module 440 processes data in status table 610 and presents the results in skill presentation 1020.

Figure 11:
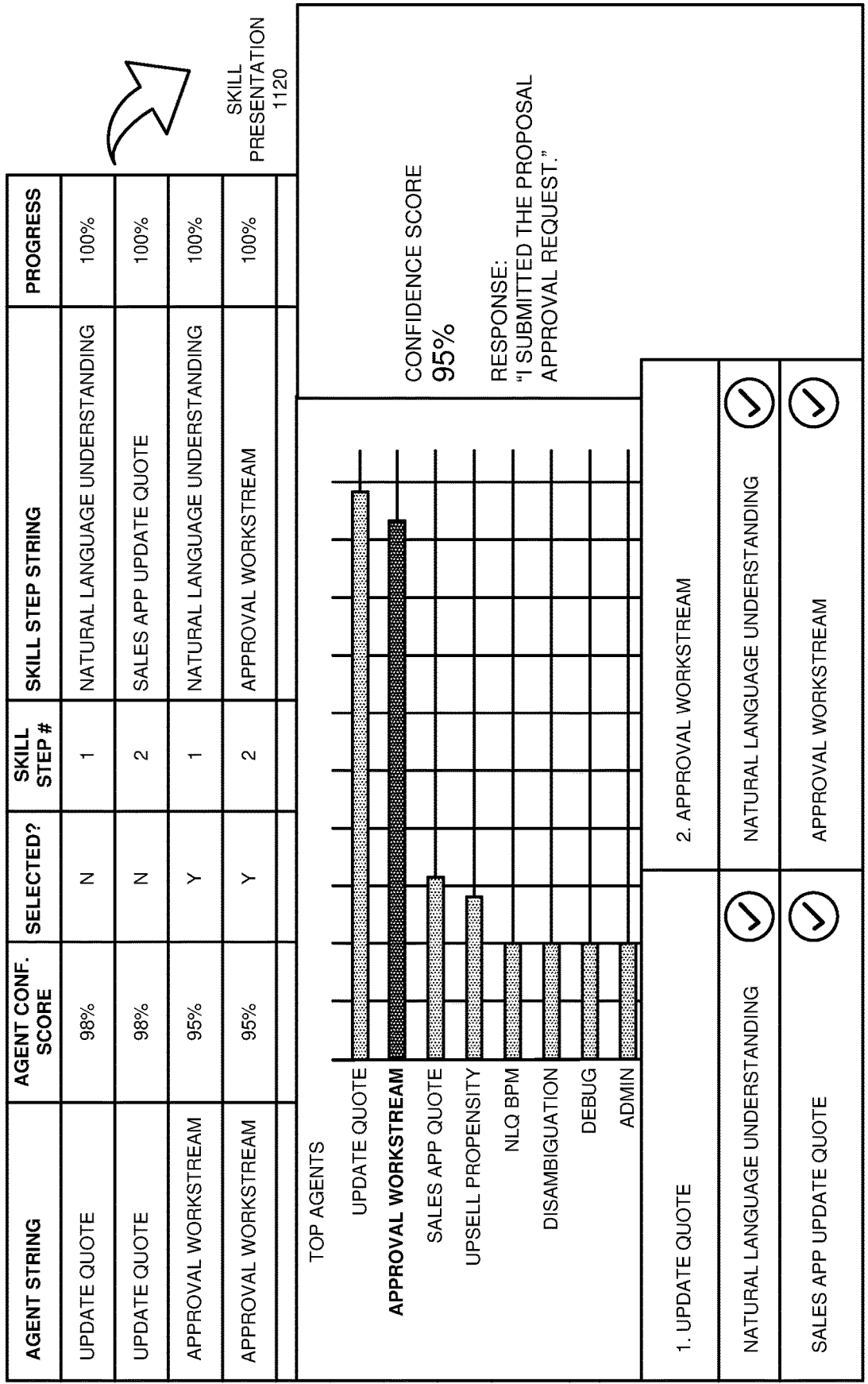
FIG. 11 depicts a continued example of conversational system action presentation in accordance with an illustrative embodiment.

With reference to FIG. 11, this figure depicts a continued example of conversational system action presentation in accordance with an illustrative embodiment. Status table 610 is the same as status table 610 in FIG. 6, with additional data added.

In particular, FIG. 11 depicts conversational system action presentation in response to user input 912 in FIG. 9. Status table 610 now includes skill performance data of one or more skills performed by a second selected agent, including a step number, a corresponding text description, and a completion percentage of the skill, Skill performance presentation module 440 processes data in status table 610 and presents the results in skill presentation 1120.

Figure 12:
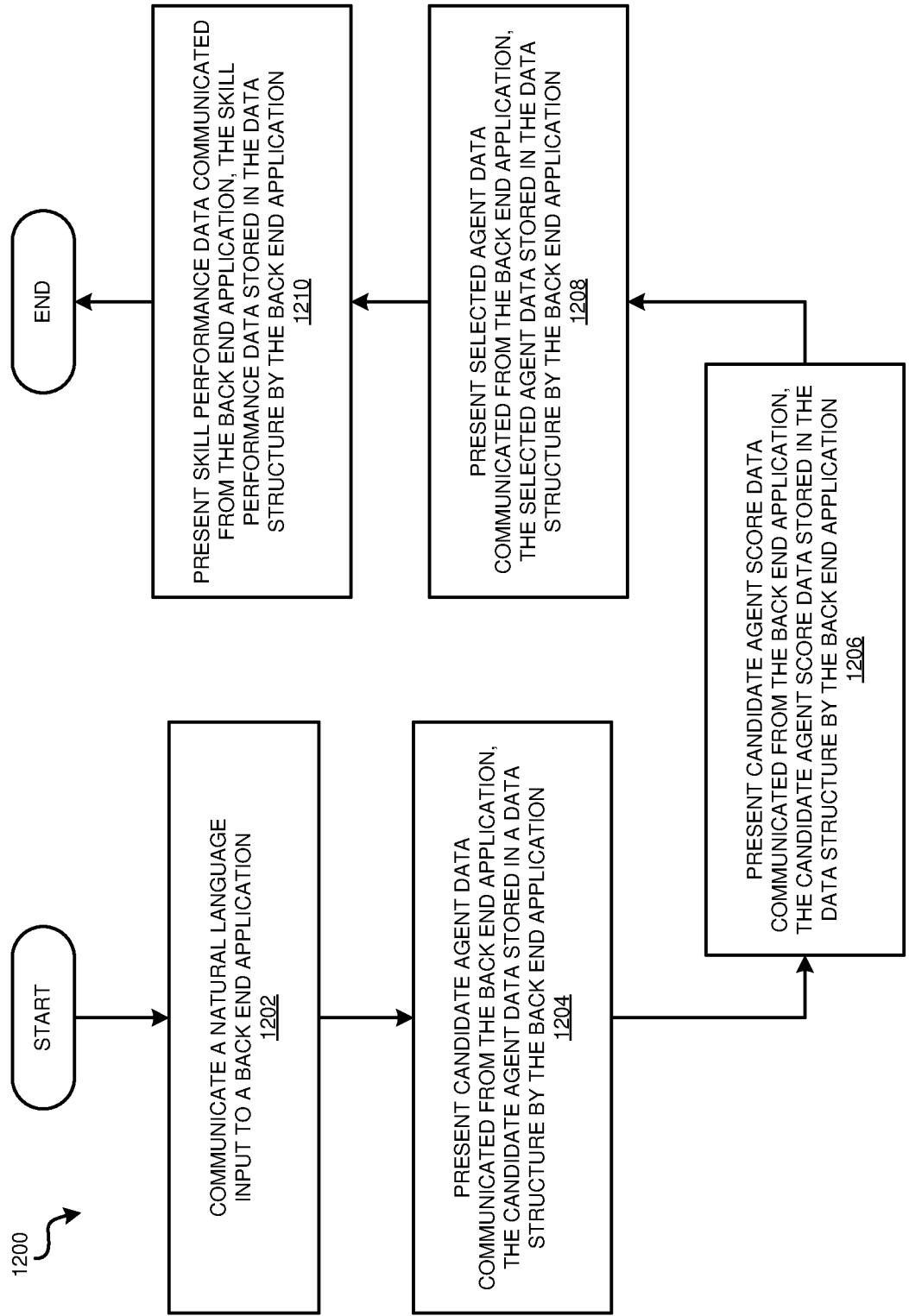
FIG. 12 depicts a flowchart of an example process for conversational system action presentation in accordance with an illustrative embodiment.

With reference to FIG. 12, this figure depicts a flowchart of an example process for conversational system action presentation in accordance with an illustrative embodiment. Process 1200 can be implemented in application 300 in FIG. 3.

In block 1202, the application communicates a natural language input to a back end application. In block 1204, the application presents candidate agent data communicated from the back end application, the candidate agent data stored in a data structure by the back end application. In block 1206, the application presents candidate agent score data communicated from the back end application, the candidate agent score data stored in the data structure by the back end application. In block 1208, the application presents selected agent data communicated from the back end application, the selected agent data stored in the data structure by the back end application. In block 1210, the application presents skill performance data communicated from the back end application, the skill performance data stored in the data structure by the back end application. Then the application ends.

Figure 13:
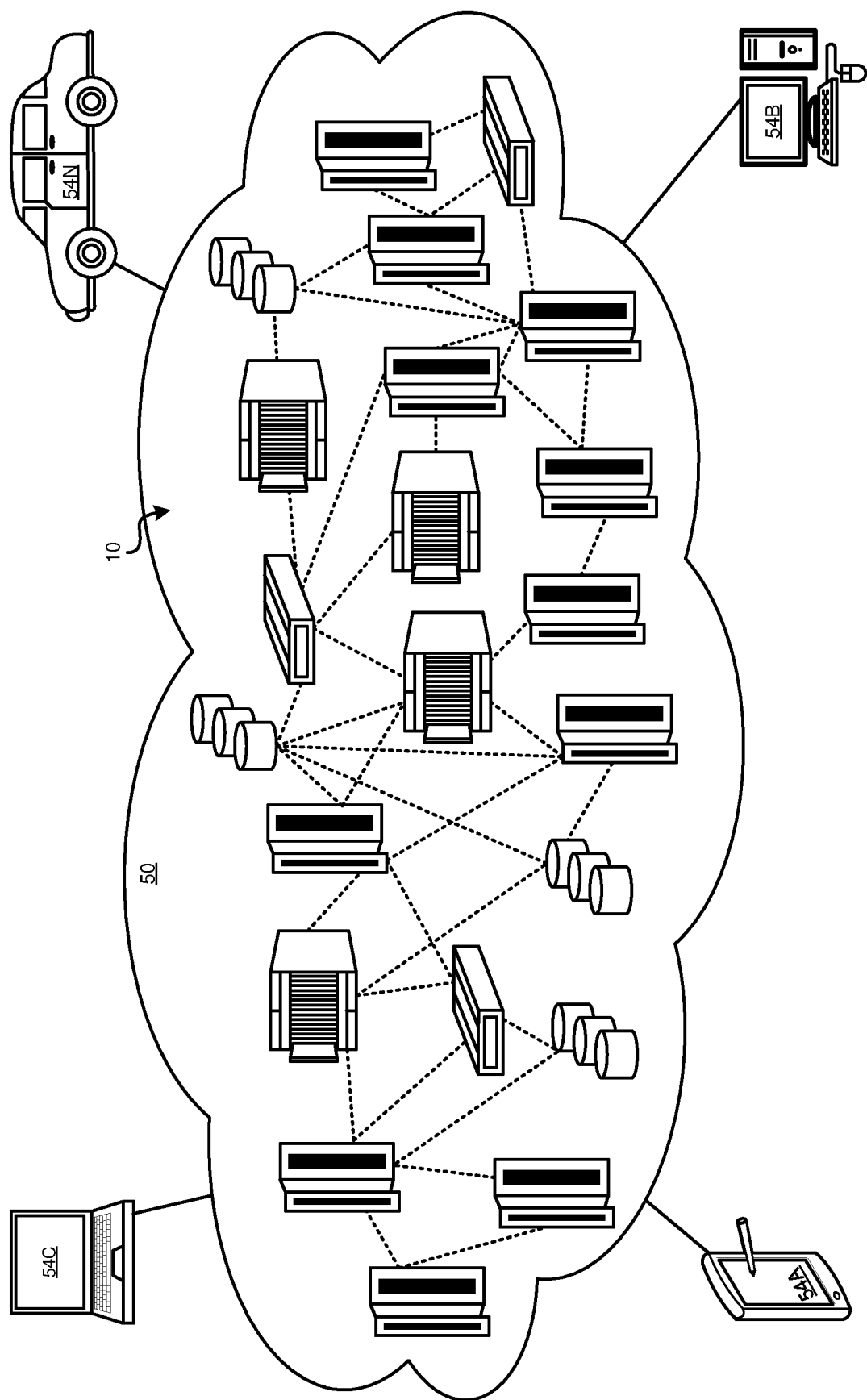
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 14:
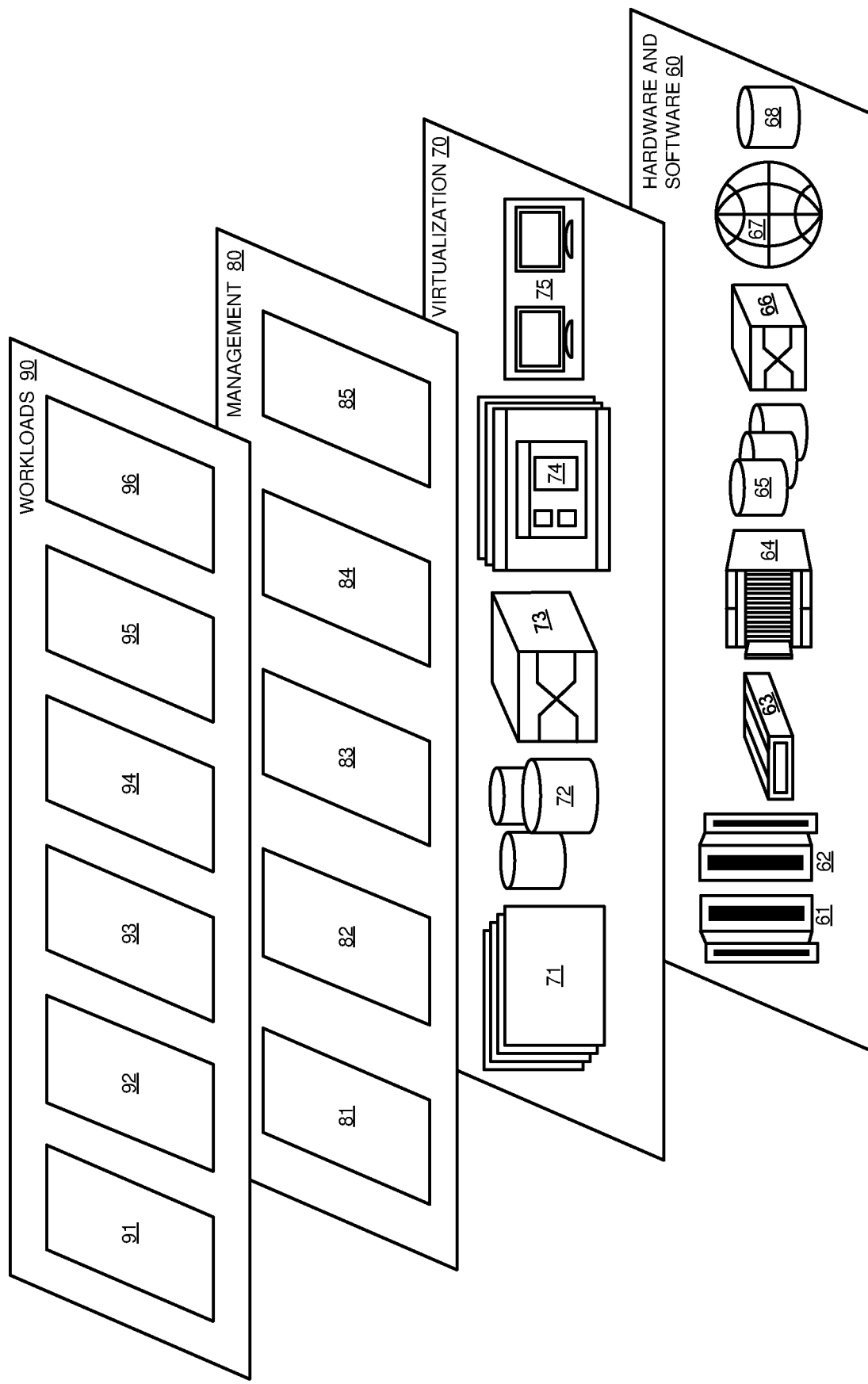
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for conversational system action presentation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    communicating, to a back end application, a natural language input;
    receiving, from the back end application, at periodic intervals, contents of a data structure, the contents of the data structure comprising candidate agent score data stored in the data structure by the back end application, the candidate agent score data comprising score data of a set of candidate agents considered by the back end application for performance of a command extracted from the natural language input;
    presenting a candidate agent in the set of candidate agents as a selected agent based on (i) the candidate agent score data, and (ii) the back end application's confidence in the selected agent's ability for performance of the command extracted from the natural language input, wherein the back-end application's confidence in the selected agent's ability is distinct from the selected agent's confidence in an output produced by the selected agent;
    presenting, corresponding to the selected agent, the candidate agent score data as selected agent score data; and
    presenting, at periodic time intervals during performance of the command extracted from the natural language input, skill performance data corresponding to the selected agent, the skill performance data stored in the data structure by the back end application and comprising a text string describing a skill, a number referencing the skill, a total number of skills performed by the selected agent, and a completion percentage of a processing step performed by the selected agent during performance of the command extracted from the natural language input, wherein the skill performance data is received from the back end application during a skill performance process of the back end application, the skill performance data comprising data of a current state of the skill performance process.

2. The computer-implemented method of claim 1, further comprising:
    receiving, from the back-end application, responsive to a request, candidate agent data.

3. The computer-implemented method of claim 1, further comprising:
    receiving, from the back-end application, candidate agent data during an agent consideration process of the back end application, the candidate agent data comprising data of a current state of the agent consideration process.

4. The computer-implemented method of claim 1, further comprising:
    receiving, from the back-end application, candidate agent data after an agent consideration process of the back end application is complete.

5. The computer-implemented method of claim 1, wherein the skill performance data is received from the back end application after a skill performance process of the back end application is complete.

6. The computer-implemented method of claim 1, wherein the candidate agent score data, the selected agent data, and the skill performance data are presented responsive to receipt of at least one of the candidate agent score data, the selected agent data, and the skill performance data.

7. The computer-implemented method of claim 1, wherein the candidate agent score data, the selected agent data, and the skill performance data are presented periodically.

8. The computer-implemented method of claim 1, wherein the candidate agent score data, the selected agent data, and the skill performance data are presented responsive to receipt of a final set of candidate agent score data, selected agent data, and skill performance data.

9. The computer-implemented method of claim 1, wherein the selected agent is replaced by an alternate agent and an agent consideration process is updated in response to feedback received subsequent to a presentation of selected agent data.

10. A computer program product for conversational system action presentation, the computer program product comprising:
one or more computer readable storage media, and program instructions collectively stored on the one or more computer readable storage media, the stored program instructions comprising:
program instructions to communicate, to a back end application, a natural language input;
program instructions to receive, from the back end application, at periodic intervals, contents of a data structure, the contents of the data structure comprising candidate agent score data stored in the data structure by the back end application, the candidate agent score data comprising score data of a set of candidate agents considered by the back end application for performance of a command extracted from the natural language input;
program instructions to present a candidate agent in the set of candidate agents as a selected agent based on (i) the candidate agent score data, and (ii) the back end application's confidence in the selected agent's ability for performance of the command extracted from the natural language input, wherein the back-end application's confidence in the selected agent's ability is distinct from the selected agent's confidence in an output produced by the selected agent;
program instructions to present, corresponding to the selected agent, the candidate agent score data as selected agent score data; and
program instructions to present, at periodic time intervals during performance of the command extracted from the natural language input, skill performance data corresponding to the selected agent, the skill performance data stored in the data structure by the back end application and comprising a text string describing a skill, a number referencing the skill, a total number of skills performed by the selected agent, and a completion percentage of a processing step performed by the selected agent during performance of the command extracted from the natural language input, wherein the skill performance data is received from the back end application during a skill performance process of the back end application, the skill performance data comprising data of a current state of the skill performance process.

11. The computer program product of claim 10, further comprising:
program instructions to receive, from the back-end application, responsive to a request, candidate agent data.

12. The computer program product of claim 10, further comprising:
program instructions to receive, from the back-end application, candidate agent data during an agent consideration process of the back end application, the candidate agent data comprising data of a current state of the agent consideration process.

13. The computer program product of claim 10, further comprising:
program instructions to receive, from the back-end application, candidate agent data after an agent consideration process of the back end application is complete.

14. The computer program product of claim 10, wherein the skill performance data is received from the back end application after a skill performance process of the back end application is complete.

15. The computer program product of claim 10, wherein the candidate agent score data, the selected agent data, and the skill performance data are presented responsive to receipt of at least one of the candidate agent score data, the selected agent data, and the skill performance data.

16. The computer program product of claim 10, wherein the stored program instructions are stored in the at least one of the one or more storage media of a local data processing system, and wherein the stored program instructions are transferred over a network from a remote data processing system.

17. The computer program product of claim 10, wherein the stored program instructions are stored in the at least one of the one or more storage media of a server data processing system, and wherein the stored program instructions are downloaded over a network to a remote data processing system for use in a computer readable storage device associated with the remote data processing system.

18. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
program instructions to communicate, to a back end application, a natural language input;
program instructions to receive, from the back end application, at periodic intervals, contents of a data structure, the contents of the data structure comprising candidate agent score data stored in the data structure by the back end application, the candidate agent score data comprising score data of a set of candidate agents considered by the back end application for performance of a command extracted from the natural language input;
program instructions to present a candidate agent in the set of candidate agents as a selected agent based on (i) the candidate agent score data, and (ii) the back end application's confidence in the selected agent's ability for performance of the command extracted from the natural language input, wherein the back-end application's confidence in the selected agent's ability is distinct from the selected agent's confidence in an output produced by the selected agent;
program instructions to present, corresponding to the selected agent, the candidate agent score data as selected agent score data; and
program instructions to present, at periodic time intervals during performance of the command extracted from the natural language input, skill performance data corresponding to the selected agent, the skill performance data stored in the data structure by the back end application and comprising a text string describing a skill, a number referencing the skill, a total number of skills performed by the selected agent, and a completion percentage of a processing step performed by the selected agent during performance of the command extracted from the natural language input, wherein the skill performance data is received from the back end application during a skill performance process of the back end application, the skill performance data comprising data of a current state of the skill performance process.

\* \* \* \* \*